Figure 1:
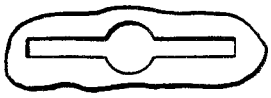
Figure 2:
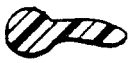
Figure 3:
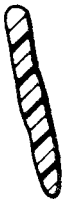
Figure 4:
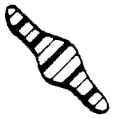
Figure 5:
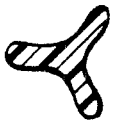
Figure 6:
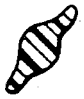
Figure 7:
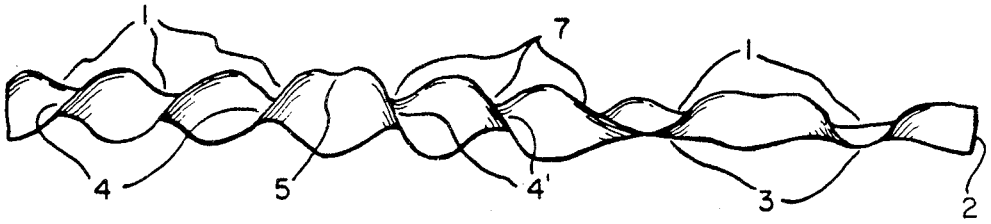

United States Defensive Publication [19] (H) [11] T105,401

Nadkarni et al. [43] May 7, 1985

[54] PROCESS FOR THE PREPARATION OF COTTON-LIKE TEREPHTHALATE POLYESTER FIBER AND YARNS

[76] Inventors: Vikas M. Nadkarni, A-6 Pranjali M.G. Rd., Thane, India, 400602; Hyunkook Shin, 134 Hitching Post Dr., Wilmington, Del. 19803

[21] Appl. No.: 580,277

[22] Filed: Feb. 16, 1984

Related U.S. Application Data

[63] Continuation of Ser. No. 418,524, Sep. 15, 1982, abandoned.

[51] Int. Cl.[3] ..... D01D 5/22

[52] U.S. Cl. ..... 264/151; 264/168; 264/177 F; 264/210.8; 264/289.6; 264/290.5

[57] ABSTRACT

Production of a high-strength, convoluted polyester staple fiber which includes use of a spinneret having a slot aperture having a width of greater than about 0.07 mm, and a length to width ratio of at least 2, spinning at a spin stretch factor of equal to or greater than 100N, where N is the number of elongated slots that make up each outlet orifice, at a spinning speed of greater than about 1500 m/min., drawing the fiber under amorphous retaining conditions by an amount greater than the natural draw ratio, mechanically crimping the fiber, cutting it to staple lengths, and relaxing the fiber 10 to 40%. The fiber is cotton-like. The preferred polyester is polyethylene terephthalate.

4 Claims, 1 Sheet Drawing,

25 Pages Specification

The file of this unexamined application may be inspected and copies thereof may be purchased (849 O.G. 1221, Apr. 9, 1968).